United States Patent

[11] 3,600,837

[72] Inventor Howard A. Bristol
 1113 Blouin Drive, Dolton, Ill. 60419
[21] Appl. No. 833,432
[22] Filed June 16, 1969
[45] Patented Aug. 24, 1971

[54] FISHING AID
 3 Claims, 6 Drawing Figs.
[52] U.S. Cl. .................................................. 43/19.2
[51] Int. Cl. .......................................... A01k 87/00
[50] Field of Search ...................................... 43/19.2, 26.1

[56] References Cited
UNITED STATES PATENTS
2,758,407  8/1956  Speidell ................... 43/19.2
2,783,576  3/1957  Filut ....................... 43/19.2
3,031,790  5/1962  Duryea .................... 43/19.2

Primary Examiner—Warner H. Camp
Attorney—Albert Siegel

ABSTRACT: A device to be used by fishermen to produce a variable selection of jigging motions in a fishline. Device has a simple motor, preferably battery operated, driving ratchet teeth which in turn activate and cause intermittent or regular controlled motions of a rod member to which the line is instantly removably affixed.

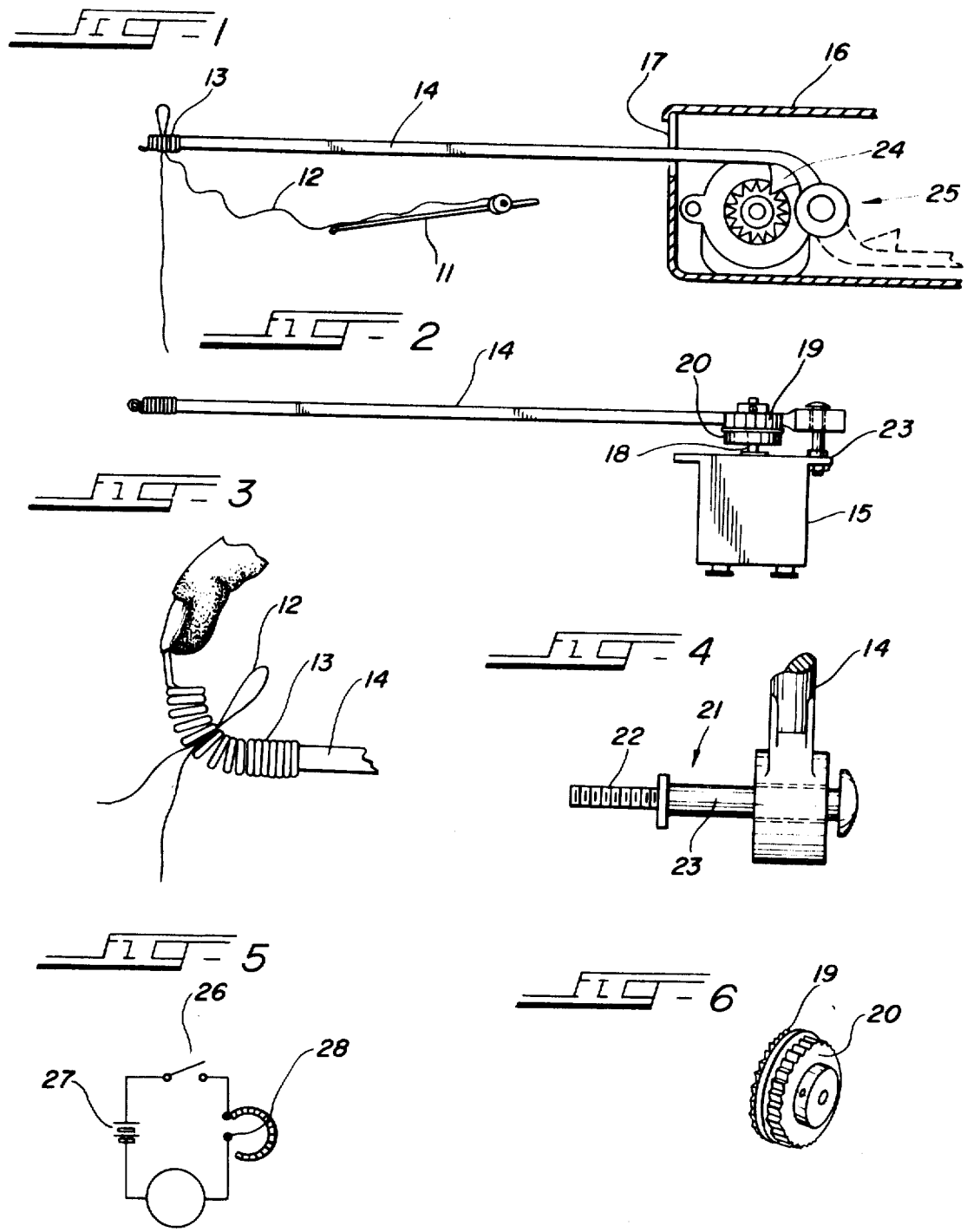

FISHING AID

BACKGROUND OF THE INVENTION

This invention relates to a fishing aid for imparting controllable jigging motions to a fishline. By using my device I provide animation to a fishing lure and can so control this device for either constant or intermittent jigging motion.

Accordingly a principal object of my invention is to provide a novel fishing aid.

This and other objects, features and advantages of my invention will become apparent to those skilled in this particular art from the following detailed disclosures thereof and the accompanying drawings in which:

FIG. 1 is a side view of my device with the motor casing in section;

FIG. 2 is a bottom view with the casing omitted;

FIG. 3 illustrates the means of attaching a fishline to the rod member hereof;

FIG. 4 illustrates the attachment and pivot of the rod member as herein provided;

FIG. 5 illustrates the electrical circuit of an embodiment hereof and

FIG. 6 illustrates a ratchet member in use herewith.

DESCRIPTION OF THE INVENTION AND THE PREFERRED EMBODIMENTS

Reference should next be had to the drawings which are made part hereof:

The numeral 11 denotes a standard fishing rod having a line 12 which line is inserted within the coils of the spring 13 located at the detached end of the rod member 14. The line is detachably inserted between two coil members as illustrated in FIG. 3.

A small motor 15, preferably battery operated, is positioned within a housing member 16, and the rod member 14 exits through a slot 17 in the housing. The motor has a drive shaft 18 to which are firmly affixed two ratchet members 19 and 20. Upon activation of the motor and rotation of the drive shaft such ratchet members are caused to rotate.

The rod member 14 is rotatably affixed to the motor housing by a partially threaded member 21. The threaded end 22 of such member is bolted onto the lip 23 on the motor housing as is illustrated in FIG. 2. Member 14 is free to be moved laterally on the unthreaded portion 23 of such member 21 as is illustrated in FIG. 4. By this means I am able to select the particular ratchet, whether continuous or intermittent to coact with the rod member 14. On the underside of the rod member 14, i.e., when the rod in the position shown in FIG. 1 is a ratchet finger. Such finger engages either ratchet members 19 or 20. When the device is not in use the member 14 may be rotated about pivot point 25 for storage as shown in shadow in FIG. 1.

In the embodiments previously described the motor 15 is driven at a constant speed and variations in jigging frequency are provided by the number of teeth on the ratchet members 19 and 20. As is illustrated in FIG. 5, in a modification hereof it is possible to also vary motor speed. In such Figure, I provide a switch 26, battery 27 and a variable potentiometer 28 all connected by leads to motor 15. Motor speed and therefore frequency are thus controlled by the potentiometer 28.

It will be understood that various modifications and variations may be effected without departing from the spirit or scope of the novel concepts of my invention.

I claim:

1. An apparatus, adapted to jiggle the line of a fishing pole comprising
   a. a housing;
   b. motor means mounted within said housing;
   c. a ratchet wheel:
      i. associated with said motor means and rotatable about a substantially horizontal axis by said motor means; and
      ii. comprising a plurality of ratchet members secured to each other in a back-to-back relation with each ratchet member differently configured to impart a different jiggling motion to said rod member and thus said fishing line;
   d. a rod member having one end pivotally mounted within said housing and having a generally depending finger mounted to said rod, said finger being engageable with any of said ratchet members;
   e. means associated with each of said ratchet members selectively engageable with said depending finger; and
   f. means for releasably grasping the line of said fishing pole, mounted to the other end of said rod member.

2. The apparatus claimed in claim 1 wherein at least one ratchet member is shaped and provided with means for imparting an intermittent jiggling motion to said rod.

3. The apparatus claimed in claim 1 wherein said rod member is pivotally and slidably mounted within said housing so as to provide means for selectively engaging said finger with different ratchet members.